United States Patent [19]

Hiscock

[11] 4,335,899
[45] Jun. 22, 1982

[54] WHEEL FOR TOY VEHICLE

[76] Inventor: Roger F. Hiscock, 23 Metchley Park Rd., Edgbaston, Birmingham B152PQ, England

[21] Appl. No.: 147,099

[22] Filed: May 7, 1980

[30] Foreign Application Priority Data

May 18, 1979 [GB] United Kingdom ................ 7917437

[51] Int. Cl.³ .............................................. B62M 1/02
[52] U.S. Cl. .................................... 280/259; 280/267; 280/282; 301/5 P
[58] Field of Search ...................... 301/5 R, 5 P, 63 P, 301/5.7, 5.3; 305/52; 152/303; 280/259, 261, 267; 180/21

[56] References Cited

U.S. PATENT DOCUMENTS 3,718,344  2/1973  Lohr et al. .......................... 280/261
3,789,947  2/1974  Blumrich ........................ 301/5 P X
3,872,940  3/1975  Gambini ........................... 305/52 X
3,882,885  5/1975  McCain ........................... 301/5 P X
4,223,753  9/1980  Bradbury ......................... 180/21 X

FOREIGN PATENT DOCUMENTS 475792  8/1951  Canada ................................ 301/5 P

OTHER PUBLICATIONS

"Series 2500 Omni", Wheel of Interrol ® (G.B.) Ltd.

Primary Examiner—Joseph F. Peters, Jr.
Assistant Examiner—Randall A. Schrecengost
Attorney, Agent, or Firm—Kenway & Jenney

[57] ABSTRACT

A rear driving wheel for a pedal car consists of a ground-engaging portion formed from a plurality of freely rotatable rollers projecting through the circumferential portion of the wheel hub and positioned such that their axes of rotation are at right angles to the axis of rotation of the hub.

4 Claims, 5 Drawing Figures

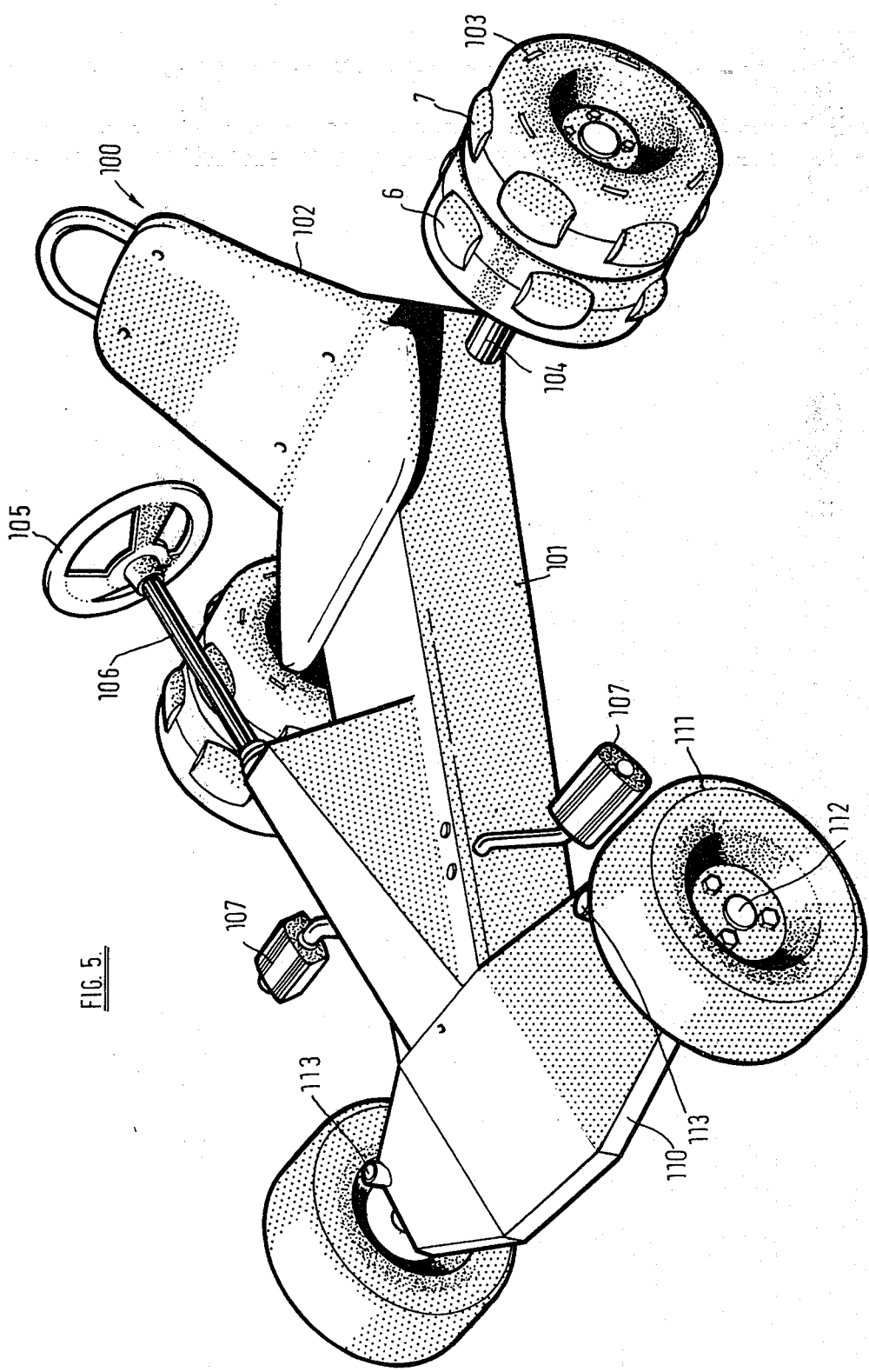

WHEEL FOR TOY VEHICLE

The present invention relates to a wheel for use in wheeled vehicles and especially to a wheel used in the manufacture of toy vehicles such as pedal cars.

Conventional wheels attached to the drive axle of wheeled vehicles, including pedal cars, are designed to ensure, so far as is practical, that the vehicle has its primary direction of motion at right angles to the axis of rotation of wheels, that is directly forwards or backwards and to resist sideways skidding motion.

We have now developed a wheel which may be used as a driving wheel for a vehicle, especially a pedal car, which will allow the vehicle to move directly forwards or backwards but which will also allow relatively free sideways movement to give an exaggerated sideways skidding effect.

This effect is achieved by providing a wheel having a hub carried on an axle and including a circumferential portion and a plurality of rollers mounted for free rotation about axles supported adjacent said circumferential portion and positioned to provide that the axes of rotation of the rollers are at right angles to the axis of rotation of the hub, said rollers projecting through apertures formed in said circumferential portion whereby the outer surfaces of the rollers are proud of the circumferential portion and form the ground-engaging surface of the wheel.

Preferably the outer surfaces of the said rollers are axially curved such that a line drawn along each said surface describes a circle concentric with the wheel.

More preferably there are two groups of rollers, the axes of rotation of the rollers in one group being parallel to the axes of rotation of the rollers of the other group and equidistant from the hub axle, the rollers in each group being positioned in overlapping relationship with respect to the rollers of the other group to provide a continuing ground-engaging surface when the wheel is rotated.

In a preferred method of construction, the wheel is formed from two pairs of dished circular members, and having edge portions and end faces, the members in each pair being arranged with their edge portions facing and in contact with each other and having corresponding mirror image recesses formed in the said edge portions of said open ends, said recesses being shaped to encompass the projecting rollers. The rollers are preferably supported for free rotation on brackets extending between the respective end faces to each pair of members and parallel to the hub axle.

The invention will now be more fully described with reference to the accompanying drawings in which:

FIG. 5 is a diagrammatic representation of a childs pedal car having rear driving wheels according to the present invention.

Figure 2:
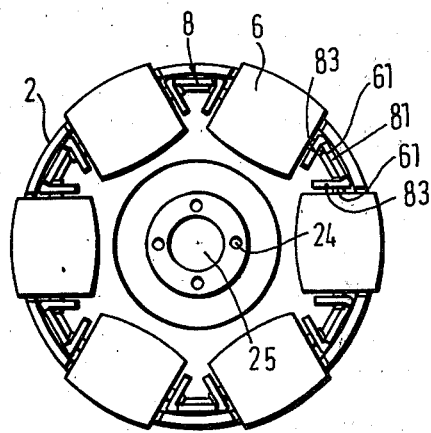
FIG. 2 is a cross-section along the line A—A of FIG. 1.
Figure 3:
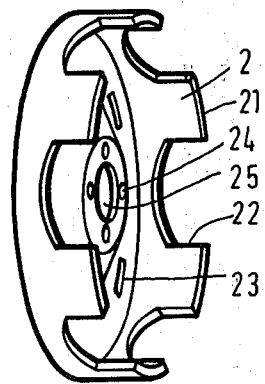
FIG. 3 is a perspective view of one dished member.
Figure 4:
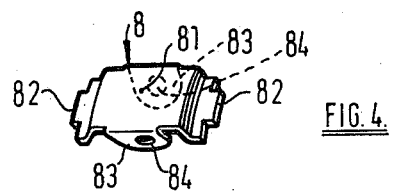
FIG. 4 is a perspective view of a roller supporting bracket.

A wheel comprises a hub portion 1 composed of two pairs of dished members 2, and 3; 4 and 5, each pair having open ends 21 and 31; 41 and 51, facing each other and the pairs located adjacent each other in a back to back relationship. One member only, 2, is shown in perspective in FIG. 2, the remaining three members having exactly the same construction and dimensions.

The ground engaging portion of the wheel is formed by two groups of six freely rotatable rollers, 6 and 7, carried on axles 61 mounted so that the projecting ends of the axles of each group lie on a circumscribing circle concentric with the wheels, both circles being of equal radius. The rollers project through mirror image recesses 22, 32; 42 and 52, formed in each dished member 2, 3, 4, and 5. Each said recess is shaped to correspond to one half of the shape of the projecting portion of the roller so that when the members are assembled there is provided a series of apertures corresponding in shape to the projecting portion of the rollers.

Axles 61 are supported on brackets 8 which consist of an elongate strip of metal 81 cranked at each end and terminating in tabs 82 adapted to locate in slots 23 in the dished members thus supporting the brackets parallel to the wheel axle. The brackets 8 also include inwardly projecting elements 83 containing holes 84, the angle of the projecting element being so arranged that the axle 61 may be inserted into the holes 84 to locate the rollers on the brackets.

The wheel, including brackets and rollers, is held together by four retaining bolts, (not shown) and associated nuts, which pass through holes 24 drilled symmetrically around apertures 25 contained in the dished members and through which the wheel axle passes.

The holes 24 in one pair of dished members, e.g. 4 and 5, are drilled such that they are "offset" by an angle of 30° compared with the holes drilled in the other pair of members. Thus, when the wheel is formed the one pair of members has to be rotated through 30° before the retaining bolts can be inserted with the result that rollers 7 are located opposite the gaps between rollers 6. The number of rollers and size of wheel are arranged so that a roller of one group overlaps two rollers of the other group thus ensuring that on rotation of the wheel (when part of a vehicle), there is continuous contact between the ground and the rollers.

The rollers are also curved along a peripheral line parallel to their axes, to produce a barrel-like appearance, the angle of curvature being so arranged that the surface of each roller in a group lies on a circumscribing circle having its centre at the axis of rotation of the wheel.

Figure 1:
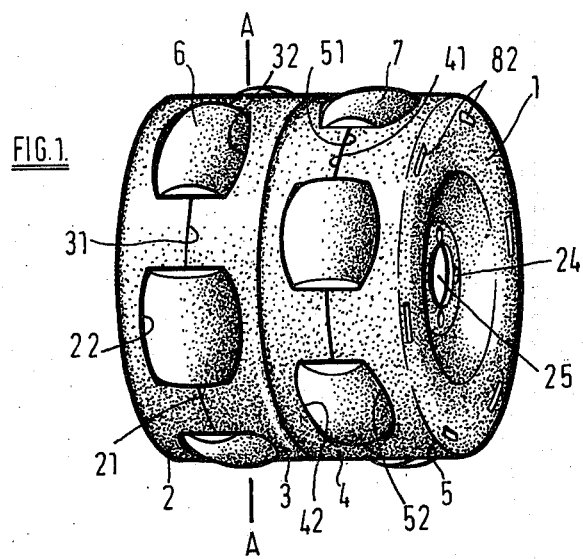
FIG. 1 is a diagrammatic representation of a wheel of the present invention in perspective view.

In the representation the childs pedal car generally indicated at 1 in FIG. 5, the car comprises an enclosed frame 101 carrying a seat 102 located at the rear end thereof. Rear driving wheels 103 are carried on a drive axle 104 mounted for rotation at the rear of frame 101. A transverse housing 110 is located at the front end of frame 101. Front wheels 111 are carried on stub axles 112 located within the end portions of housing 110 and carried on vertical pivot pins 113 for pivotal movement to effect steering of the pedal car. Control of the front wheels for steering is by steering wheel 105 carried on a steering column 106 which co-acts with the front wheels through conventional steering linkages (not shown). Drive to the rear driving wheels is by a chain and sprocket (not shown) from foot pedals 107 carried at the front end of frame 101 behind the transverse housing 110. Drive wheels 103 are constructed as described with reference to FIG. 1.

The provision, in the pedal car, of rear driving wheels constructed according to the present invention allows the driver to readily cause the rear end of the car to slide to the right or left by appropriate steering, thus simulating cornering in a racing car and adding to the enjoyment of the driver.

I claim:

1. A pedal car comprising a frame carrying a seat and including a front axle carrying front wheels pivotally mounted for steering said car, said front wheels having a generally integral outer surface constructed to roll forward and backward along the plane of the wheel while resisting a lateral motion in a direction along the axis of rotation of the wheel, a steering wheel mounted adjacent said seat and adapted to steer said front wheels through linkage means connecting said steering wheel and said front wheels, a rear axle carrying driving wheels and driven by pedal means drivably connected to said axle and mounted on said frame, each said driving wheel being carried by said rear axle by rotation therewith and comprising a circumferential portion, a hub for mounting said wheel on said rear axle and including a plurality of rollers, said rollers being mounted for free rotation about axles supported adjacent said circumferential portion and positioned to provide that the axes of rotation of said rollers are at right angles to the hub axle, said rollers projecting through apertures in said circumferential portion whereby the said outer surfaces of the rollers are proud of the circumferential portion and form a ground-engaging surface of the wheel.

2. A pedal car according to claim 1 wherein each said driving wheel the outer surfaces of said rollers are axially curved to provide that a continuous line drawn along said surface describes a circle with the said hub axle as its centre.

3. A pedal car according to claim 2 wherein in each said driving wheel there are two groups of rollers, the axes of rotation of the rollers in one group being parallel to the axes of rotation of the rollers of the other group and equidistant from the hub axle, the rollers in each group being positioned in overlapping relationship with respect to the rollers of the other group to provide a continuing ground engaging surface when the wheel is rotated.

4. A pedal car according to claim 3 wherein each driving wheel is constructed from two pairs of dished circular members having the same radius and including edge portions and end faces, the dished members in each pair being arranged to have their edge portions facing and adjacent each other, corresponding mirror image recesses being formed in the said edge portions of each said member, said recesses forming an aperture of a size and shape to encompass the projecting rollers.

* * * * *